United States Patent
Usuda et al.

(10) Patent No.: US 7,894,845 B2
(45) Date of Patent: Feb. 22, 2011

(54) TRANSMISSION POWER CONTROL METHOD, MOBILE STATION, RADIO BASE STATION AND RADIO NETWORK CONTROLLER

(75) Inventors: Masafumi Usuda, Tokyo (JP); Anil Umesh, Yokohama (JP)

(73) Assignee: NTT DoCoMo, Inc., Tokyo (JP)

(*) Notice: Subject to any disclaimer, the term of this patent is extended or adjusted under 35 U.S.C. 154(b) by 459 days.

(21) Appl. No.: 11/913,213

(22) PCT Filed: May 2, 2006

(86) PCT No.: PCT/JP2006/309158

§ 371 (c)(1),
(2), (4) Date: Feb. 13, 2008

(87) PCT Pub. No.: WO2006/118301

PCT Pub. Date: Nov. 9, 2006

(65) Prior Publication Data

US 2008/0214227 A1 Sep. 4, 2008

(30) Foreign Application Priority Data

May 2, 2005 (JP) .............................. 2005-134506

(51) Int. Cl.
*H04Q 7/20* (2006.01)
*H04B 7/00* (2006.01)
(52) U.S. Cl. .................. 455/522; 455/69; 455/516; 455/127.1
(58) Field of Classification Search .............. 455/522, 455/69, 67.11, 452.1, 450, 452.2, 517, 516, 455/127.1, 126, 412.2; 370/318
See application file for complete search history.

(56) References Cited

U.S. PATENT DOCUMENTS

| | | | |
|---|---|---|---|
| 6,842,624 B2 | 1/2005 | Sarkar et al. | |
| 2002/0082020 A1* | 6/2002 | Lee et al. | 455/450 |
| 2004/0185892 A1* | 9/2004 | Iacono et al. | 455/522 |
| 2005/0143116 A1* | 6/2005 | Hsu et al. | 455/522 |

FOREIGN PATENT DOCUMENTS

| | | |
|---|---|---|
| JP | 2004-080531 | 3/2004 |
| JP | 2005-005762 | 1/2005 |
| JP | 2005-502262 | 1/2005 |

OTHER PUBLICATIONS

3GPP TSG-RAN WG2 Meeting #46bis R2-050937, "Outer loop power control for E-DCH", Ericsson, Beijing, China, Apr. 4-8, 2005, 2 pages.

\* cited by examiner

*Primary Examiner*—John Lee
(74) *Attorney, Agent, or Firm*—Marvin A. Motsenbocker; Mots Law, PLLC

(57) ABSTRACT

The present invention performs an outer loop transmission power control in a more stable manner by preventing a status of being unable to detect an Enhanced Dedicated Physical Control Channel (E-DPCCH). A transmission power control method according to the present application includes: generating, at a mobile station UE, a transport block having a predetermined minimum transport block size, when information to be transmitted to a radio base station Node B does not exist; transmitting, from the mobile station UE to the radio base station Node B, the transport block by a transmission timing predetermined by a mobile communication system or a transmission timing notified from a radio network controller RNC; receiving, at the radio base station Node B, the transport block in accordance with the transmission timing; and controlling, at the radio base station Node B, the transmission power, according to a reception quality of the transport block.

6 Claims, 7 Drawing Sheets

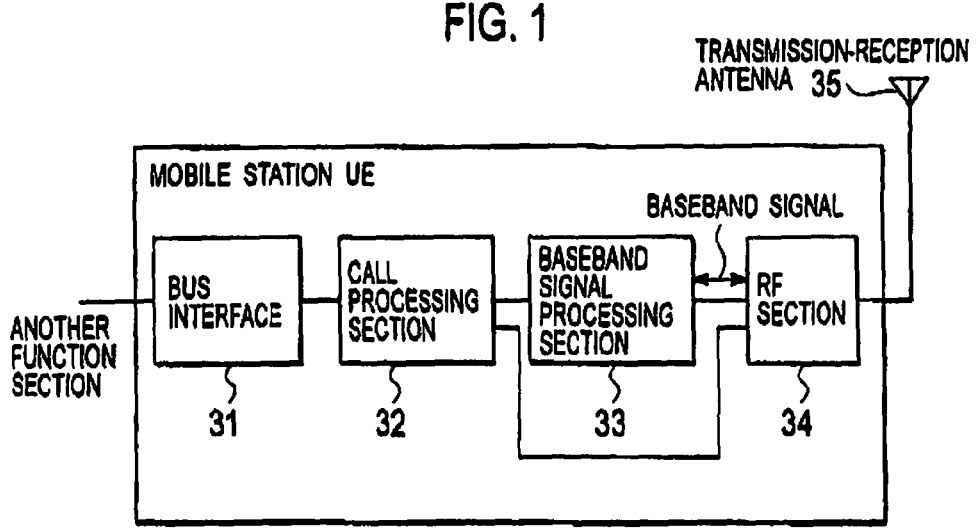
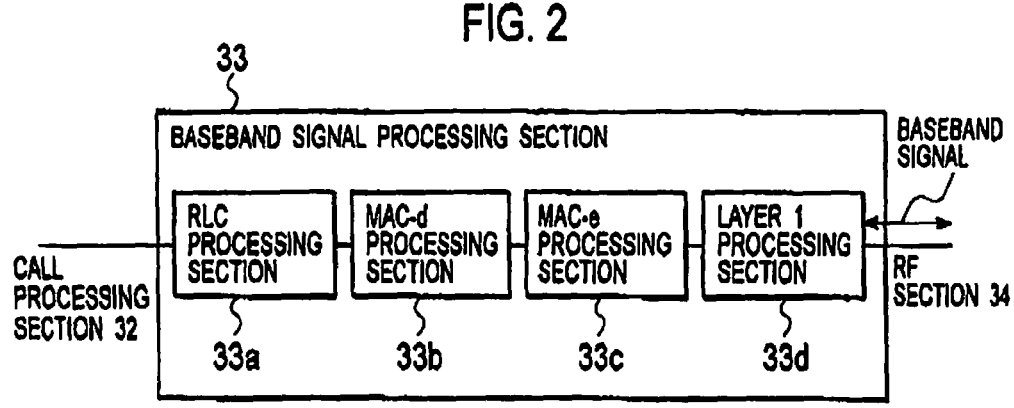
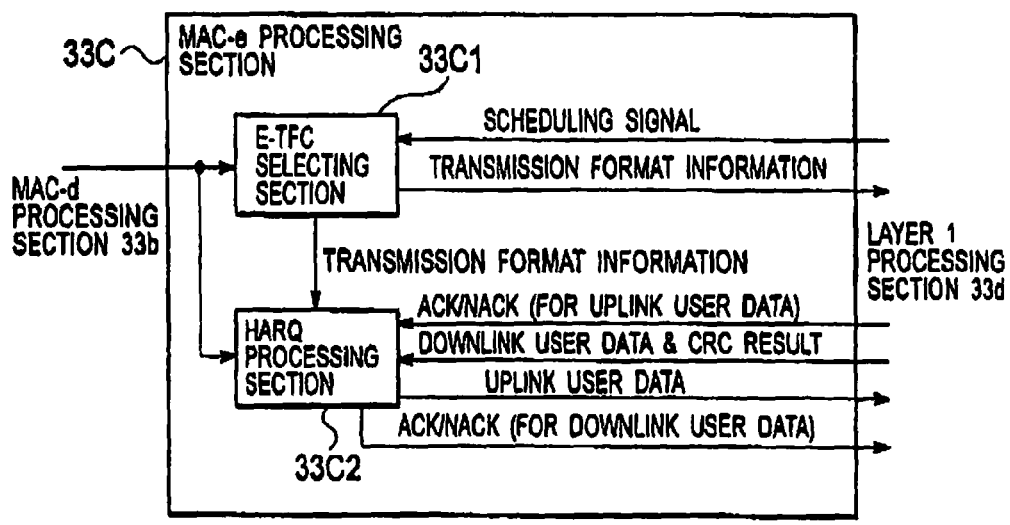

TRANSMISSION POWER CONTROL METHOD, MOBILE STATION, RADIO BASE STATION AND RADIO NETWORK CONTROLLER

TECHNICAL FIELD

The present invention relates to a transmission power control method, a mobile station, a radio base station and a radio network controller, which controls a transmission power of data transmitted from the mobile station to the radio base station via an uplink.

BACKGROUND ART

In a conventional mobile communication system, in an uplink from a mobile station UE to a radio base station Node B, a radio network controller RNC is configured to determine a transmission rate of a dedicated channel, in consideration of radio resources of the radio base station Node B, an interference volume in an uplink, transmission power of the mobile station UE, transmission processing performance of the mobile station UE, a transmission rate required for an upper application, and the like, and to notify the determined transmission rate of the dedicated channel by a message in a layer-3 (Radio Resource Control Layer) to both of the mobile station UE and the radio base station Node B.

Here, the radio network controller RNC is provided at an upper level of the radio base station Node B, and is an apparatus configured to control the radio base station Node B and the mobile station UE.

In general, data communications often cause burst traffic compared with voice communications or TV communications. Therefore, it is preferable that a transmission rate of a channel used for the data communications is changed fast.

However, as shown in FIG. 10, the radio network controller RNC integrally controls a plurality of radio base stations Node B in general. Therefore, in the conventional mobile communication system, there has been a problem that it is difficult to perform fast control for changing of the transmission rate of channel (for example, per approximately 1 through 100 ms), due to processing load, processing delay, or the like.

In addition, in the conventional mobile communication system, there has also been a problem that costs for implementing an apparatus and for operating a network are substantially increased even if the fast control for changing of the transmission rate of the channel can be performed.

Therefore, in the conventional mobile communication system, control for changing of the transmission rate of the channel is generally performed on the order from a few hundred ms to a few seconds.

Accordingly, in the conventional mobile communication system, when burst data transmission is performed as shown in FIG. 11(a), the data are transmitted by accepting low-speed, high-delay, and low-transmission efficiency as shown in FIG. 11(b), or, as shown in FIG. 11(c), by reserving radio resources for high-speed communications to accept that radio bandwidth resources in an unoccupied state and hardware resources in the radio base station Node B are wasted.

It should be noted that both of the above-described radio bandwidth resources and hardware resources are applied to the vertical radio resources in FIG. 11.

Therefore, the 3rd Generation Partnership Project (3GPP) and the 3rd Generation Partnership Project 2 (3GPP2), which are international standardization organizations of the third generation mobile communication system, have discussed a method for controlling radio resources at high speed in a layer-1 and a media access control (MAC) sub-layer (a layer-2) between the radio base station Node B and the mobile station UE, so as to utilize the radio resources effectively. Such discussions or discussed functions will be hereinafter referred to as "Enhanced Uplink (EUL)".

With reference to FIG. 12, descriptions will be given for a transmission power control in the enhanced uplink. To simplify the description, parts unnecessary for the description, such as an RF section and an antenna, are omitted in the example of FIG. 12.

Firstly, "inner-loop transmission power control" in the enhanced uplink will be described.

In step S101, a transmitter of a mobile station UE transmits data to a radio base station Node B via an uplink.

Here, the transmitter of the mobile station UE periodically transmits a dedicated physical control channel (DPCCH) to which layer 1 control information such as a pilot and a TPC command are mapped. Further, in accordance with presence or absence of data, presence or absence of a transmission allocation, or the like, the transmitter of the mobile station UE transmits either a dedicated physical data channel (DPDCH) or an enhanced dedicated physical data channel (E-DPDCH), to which user date or control information of layer 2 or higher are mapped.

In step S102, an SIR calculating section of a radio base station Node B calculates a signal-to-interference ratio (a reception SIR) of the received DPCCH, and compares a set target SIR with the calculated reception SIR.

In step S103, when the comparison result shows "received SIR>target SIR", the SIR calculator notifies the transmitter to transmit a "Down" command. On the other hand, when the comparison result shows "received SIR<target SIR", the SIR calculator notifies the transmitter to transmit an "Up" command. A series of operation described above is referred to as an "inner-loop transmission power control."

Secondly, "outer loop transmission power control" in the enhanced uplink will be described.

In step S201, a receiver of a radio network controller RNC measures a reception quality of the E-DPDCH (or of the DPDCH).

In step S202, a controller of the radio network controller RNC sets a target SIR in accordance with the measurement result, and notifies the target SIR to the radio base station Node B. In addition, the controller of the radio network controller RNC determines an amplitude ratio between the E-DPDCH and the DPCCH (hereinafter referred to as "gain factor") in accordance with the measurement result so as to notify the determined amplitude ratio to the mobile station UE. Here, both of the E-DPDCH and the DPCCH are transmitted from the mobile station UE. A series of operation Is referred to as an "outer loop transmission power control."

The outer loop transmission power control can be adapted to various fluctuation in the radio environment, such as when a mobile station UE shifts to a soft handover status, when a moving speed of the mobile station UE changes, when radio waves are interrupted by a building, or the like.

Further, since the outer loop transmission power control includes measuring the reception quality of the E-DPDCH as described above, the outer loop transmission power control is not performed when the transmission of the E-DPDCH does not exist.

Accordingly, for example, the following method has been proposed (for example, refer to Non-patent Document 1); The mobile station UE generates a transport block having a minimum transport block size, by inserting dummy data into such as MAC layer control information or blank information or the like (that is, performing a padding). Then, the mobile station UE transmits, at a predetermined transmission period, the transport block by using an Enhanced Dedicated Physical Control Channel (E-DPCCH) and the E-DPDCH.

According to the above-described method, even when data to be transmitted does not exist in the mobile station UE, the radio network controller RNC enables to measure the reception quality of the E-DPDCH, and thus the outer loop transmission power control can be performed. Therefore, it is possible to reduce deterioration in a radio quality caused by an interruption of transmission data.

However, in the above-described method, there has been a problem that, since the transmission timing of the transport block (that is, a frame number of the frame used for transmitting the transport block) is not previously notified to the RNC, the radio network controller RNC cannot detect the E-DPDCH when the E-DPCCH cannot be detected correctly. In that case, the outer loop transmission power control cannot be performed.

Non-patent Document 1: 3GPP TSG-RAN R2-05937

DISCLOSURE OF THE INVENTION

The present invention has been made in view of the above-mentioned problems, and its object is to provide a transmission power control method, a mobile station, a radio base station, and a radio network controller that make it possible to perform an outer loop transmission power control in a more stable manner by preventing a status of being unable to detect the E-DPCCH and the E-DPDCH.

A first aspect of the present invention is summarized as a transmission power control method which controls a transmission power of data transmitted from a mobile station to a radio base station via an uplink, including: generating, at the mobile station, a transport block having a predetermined minimum transport block size, when information to be transmitted to the radio base station does not exist; transmitting, from the mobile station to the radio base station, the transport block in a frame having a frame number predetermined by a mobile communication system or in a frame having a frame number notified from a radio network controller; extracting, at the radio base station, the transport block included in the frame having the frame number; and performing, at the radio base station and at the radio network controller, an outer loop transmission power control on the transmission power, according to a reception quality of the transport block.

In the first aspect of the present invention, the transport block may be generated by performing a padding on MAC layer information which includes a status of the mobile station.

In the first aspect of the present invention, the transport block may be generated by performing a padding on blank information.

A second aspect of the present invention is summarized as a mobile station, including a transport block generating section configured to generate a transport block having a predetermined minimum transport block size, when information to be transmitted to a radio base station does not exist; and a transport block generating section configured to transmit, to the radio base station, the transport block in a frame having a frame number predetermined by a mobile communication system or in a frame having a frame number notified from a radio network controller.

A third aspect of the present invention is summarized as a radio base station for achieving a transmission power control method which controls a transmission power of data transmitted from a mobile station to the radio base station via an uplink, including: an extraction section configured to receive a frame transmitted from the mobile station, and to extract a transport block having a predetermined minimum transport block size, the transport block included in a frame having a frame number predetermined by a mobile communication system or in a frame having a frame number notified from a radio network controller; and a notification section configured to notify, to the radio network controller, a reception quality of the extracted transport block.

A fourth aspect of the present invention is summarized as a radio network controller for achieving a transmission power control method which controls a transmission power of data transmitted from a mobile station to a radio base station via an uplink, including: a notification section configured to notify, to the mobile station and the radio base station, a frame number of a frame for transmitting a transport block having a predetermined minimum transport block size, when information to be transmitted from the mobile station to the radio bass station does not exist; and an outer loop transmission power control section configured to perform an outer loop transmission power control on the transmission power, according to a reception quality of the transport block having the predetermined minimum transport block size, the reception quality notified from the radio base station.

BRIEF DESCRIPTION OF THE DRAWINGS

FIG. 1 is a functional block diagram of a mobile station of a mobile communication system according to the first embodiment of the present invention.

FIG. 2 is a functional block diagram of a baseband signal processing section in a mobile station of the mobile communication system according to the first embodiment of the present invention.

FIG. 3 is a functional block diagram of a MAC-e processing section of the baseband signal processing section in a mobile station of the mobile communication system according to the first embodiment of the present invention.

BEST MODES FOR CARRYING OUT THE INVENTION

Figure 10:
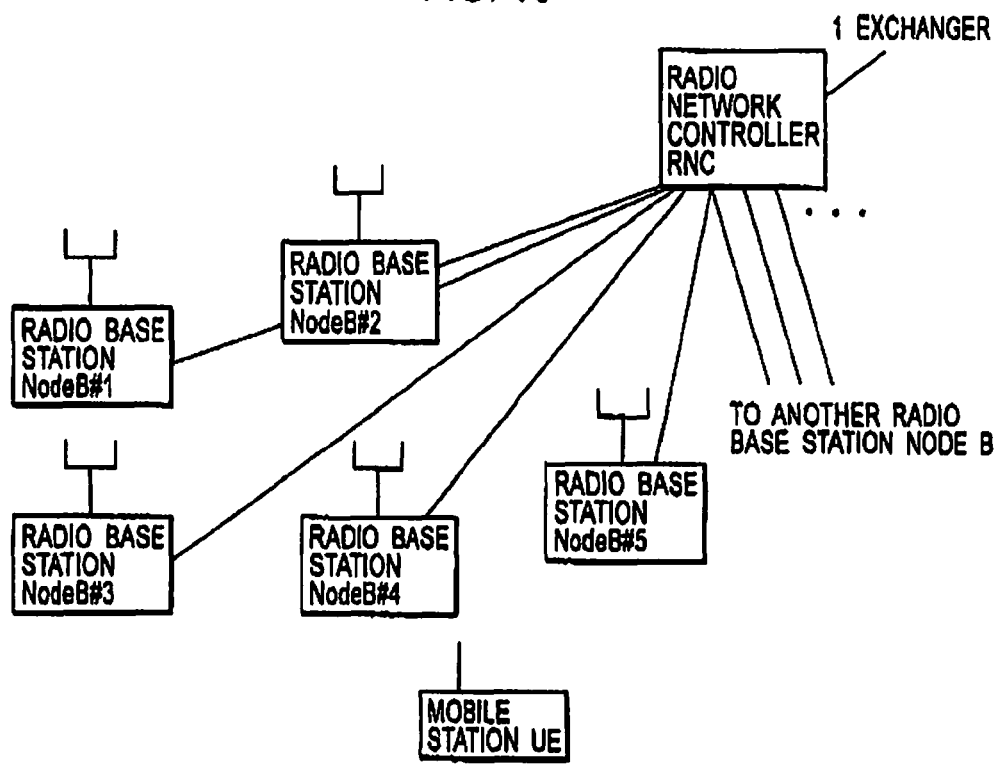
FIG. 10 is a diagram showing an entire configuration of a general mobile communication system.
Figure 11:
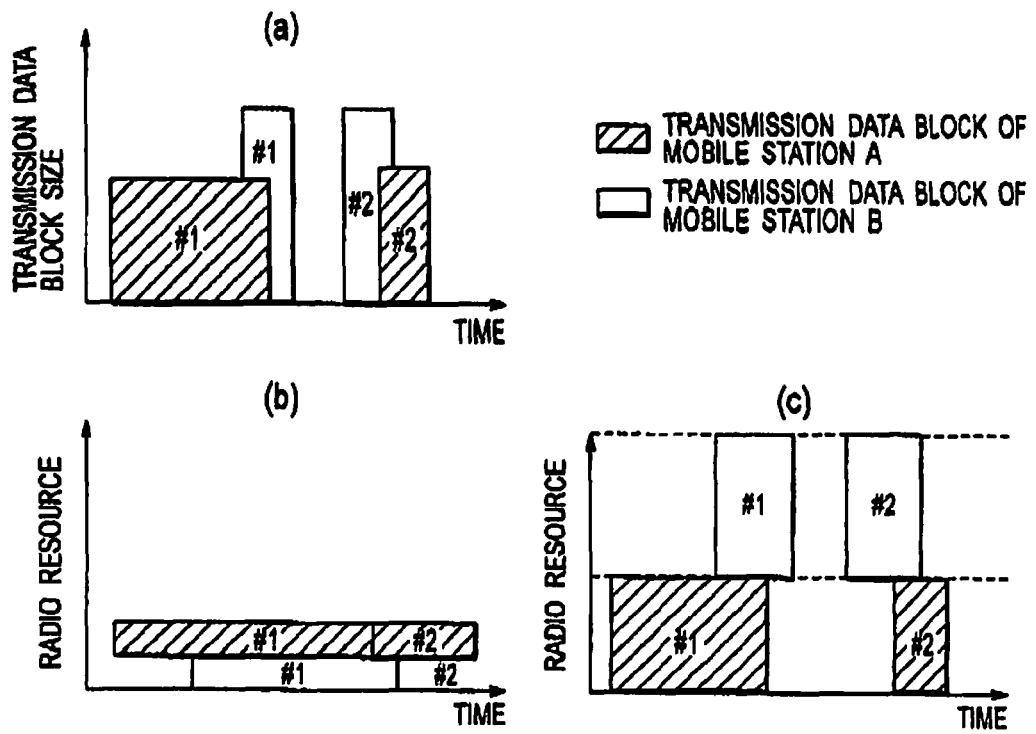
FIGS. 11(a) to 11(c) are graphs illustrating operations at the time of burst data transmission in a conventional mobile communication system.
Figure 12:
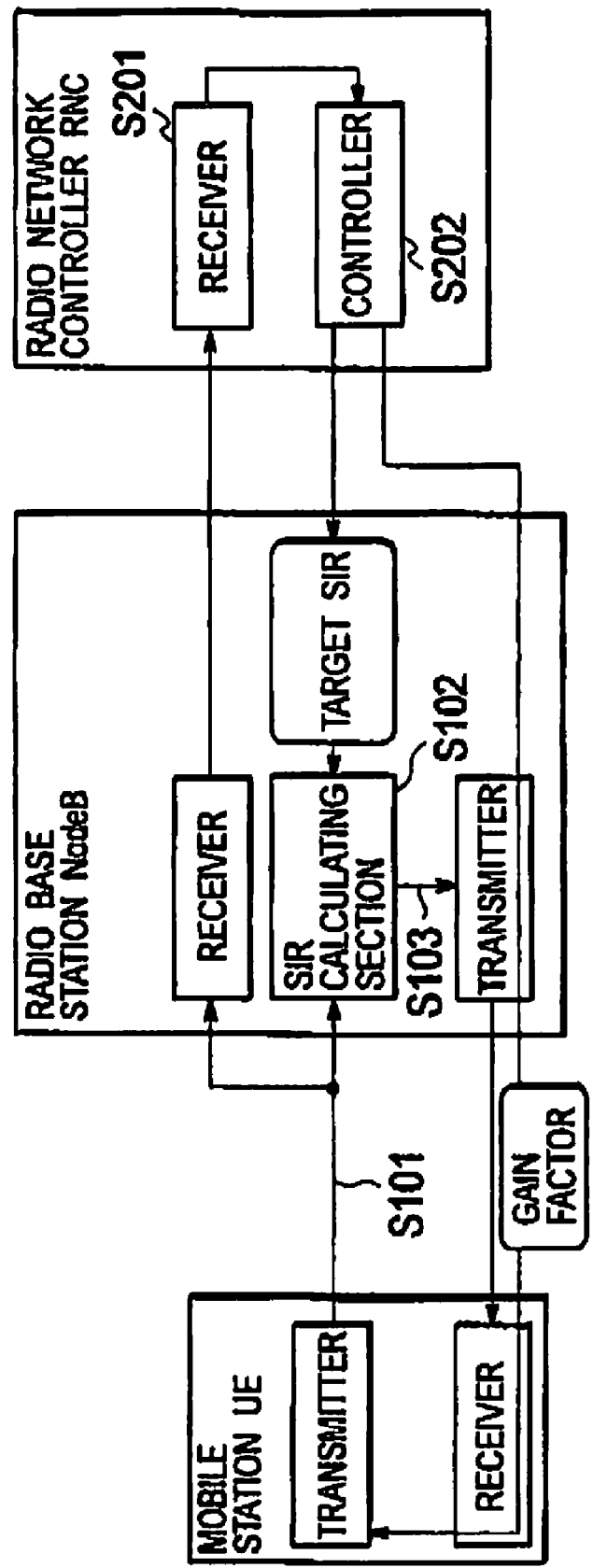
FIG. 12 is a diagram showing the mechanism of transmission power control in the enhanced uplink in a conventional mobile communication system.

Mobile Communication System According to a First Embodiment of the Present Invention An explanation will be given for the configuration of a mobile communication system according to a first embodiment of the present invention with reference to FIGS. 1 to 8. Note that the mobile communication system according to this embodiment includes a plurality of radio base stations Node B#1 to #5 and a radio network controller RNC, as shown in FIG. 10.

In addition, in the mobile communication system according to this embodiment, a "High Speed Downlink Packet Access (HSDPA)" is used in a downlink, and an "Enhanced Uplink (EUL)" is used in an uplink. It should be noted that in both of the HSDPA and the EUL, retransmission control (N process stop and wait) shall be performed by a "Hybrid Automatic Repeat Request (HARQ)".

Therefore, an Enhanced Dedicated Physical Channel (E-DPCH), configured of an Enhanced Dedicated Physical Data Channel (E-DPDCH) and an Enhanced Dedicated Physical Control Channel (E-DPCH), and a Dedicated Physical Channel (DPCH), configured of a Dedicated Physical Data Channel (DPDCH) and a Dedicated Physical Control Channel (DPCCH), are used in the uplink.

Here, the E-DPCCH transmits control data for the EUL such as a transmission format number for defining a transmission format (transmission block size, or the like) of the E-DPDCH, HARQ related information (the number of retransmissions, or the like), and scheduling related information (transmission power, buffer residence-volume, or the like in the mobile station UE).

In addition, the E-DPDCH is paired with the E-DPCCH, and transmits user data for the mobile station UE based on the control data for the EUL transmitted through the E-DPCCH.

The DPCCH transmits control data such as a pilot symbol that is used for RAKE combining, SIR measurement, or the like, a Transport Format Combination Indicator (TFCI) for identifying a transmission format of uplink DPDCH, and a transmission power control bit in a downlink.

In addition, the DPDCH is paired with the DPCCH, and transmits user data for the mobile station UE based on the control data transmitted through the DPCCH. However, if user data to be transmitted does not exist in the mobile station UE, the DPDCH can be configured not to be transmitted.

In addition, in the uplink, a "High Speed Dedicated Physical Control Channel (HS-DPCCH)" and a Random Access Channel (RACH) are used, both of which are required when the HSPDA is applied.

The HS-DPCCH transmits a Channel Quality Indicator (CQI) and a transmission acknowledgement signal ("Ack" or "Nack") for the HS-DPCCH.

As shown in FIG. 1, the mobile station UE according to this embodiment is provided with a bus interface 31, a call processing section 32, a baseband processing section 33, a radio frequency (RF) section 34, and a transmission—reception antenna 35.

However, these functions can be independently present as a hardware, and can be partly or entirely integrated, or can be configured through a process of software.

The bus interface 31 is configured to forward user data outputted from the call processing section 32 to another functional section (for example, an application related functional section). In addition, the bus interface 31 is configured to forward user data transmitted from another functional section (for example, the application related functional section) to the call processing section 32.

The call processing section 32 is configured to perform a call control processing for transmitting and receiving user data.

The baseband signal processing section 33 is configured to, acquire user data by performing a layer-1 processing including a despreading processing, a RAKE combining processing, and a Forward Error Correction (FEC) decode processing, a Media Access Control (MAC) processing including a MAC-e processing and a MAC-d processing, and a Radio Link Control (RLC) processing, against the baseband signals transmitted from the RF section 34, so as to transmit the acquired user data to the call processing section 32.

In addition, the baseband signal processing section 33 is configured to generate the baseband signals by performing the RLC processing, the MAC processing, or the layer-1 processing against the user data transmitted from the call processing section 32 so as to transmit the baseband signals to the RF section 34.

Detailed description of the functions of the baseband signal processing section 33 will be given later. The RF section 34 is configured to generate baseband signals by performing the detection processing, the filtering processing, the quantization processing, or the like against radio frequency signals received via the transmission-reception antenna 35, so as to transmit the generated baseband signals to the baseband signal processing section 33.

As shown in FIG. 2, the baseband signal processing section 33 is provided with an RLC processing section 33a, a MAC-d processing section 33b, a MAC-e processing section 33c, and a layer-1 processing section 33d.

The RLC processing section 33a is configured to perform a processing (RLC processing) of an upper layer of a layer-2, against user data transmitted from the call processing section 32 so as to transmit the user date to the MAC-c processing section 33b.

The MAC-d processing section 33b is configured to attach a channel identifier header, and to generate the transmission format in the uplink in accordance with the transmission power limit in the uplink.

As shown in FIG. 3, the MAC-e processing section 33c is provided with an Enhanced Transport Format Combination (E-TFC) selecting section 33c1 and an HARQ processing section 33c2.

The E-TFC selecting section 33c1 is configured to determine a transmission format (E-TFC) of the E-DPDCH and the E-DPCCH, based on scheduling signals transmitted from the radio base station Node B.

In addition, the E-TFC selecting section 33c1 is configured to transmit transmission format information on the determined transmission format (that is, a transmission data block size, a transmission power ratio between the E-DPDCH and the DPCCH, or the like) to the layer-1 processing section 33d, and to transmit the determined transmission format information to the HARQ processing section 33c2.

Such scheduling signals are information notified in the cell where the mobile station UE is located, and include control information for all the mobile stations located in the cell, or a specific group of the mobile stations located in the cell.

The HARQ processing section 33c2 is configured to perform process control for the "stop-and-wait of N-process", so as to transmit the user data in the uplink based on the transmission acknowledgement signals (Ack/Nack for uplink data) transmitted from the radio base station Node B.

Specifically, the HARQ processing section 33c2 is configured to determine, based on a CRC result entered from the layer-1 processing section 33d, whether or not the reception processing of the uplink user data has been successful. Then, the HARQ processing section 33c2 generates the transmission acknowledgement signal (Ack or Neck) based on the determination result, and transmits the generated transmission acknowledgement signal to the layer 1 processing section 33d. When the determination result is "OK", the HARQ processing section 33c2 transmits, to the MAC-d processing section 33d, the downlink user data entered from the layer 1 processing section 33d.

Further, when information to be transmitted to the radio base station Node B does not exist, the HARQ processing section 33c2 generates a transport block (control PDU) having a predetermined minimum transport block size (TBS) so as to transmit the transport block to the radio base station by a transmission timing predetermined by the mobile communication system, or by a transmission timing notified from the radio network controller RNC.

To be more specific, the HARQ processing section 33c2 is configured to transmit by using the E-DPDCH or the E-DPCCH, the transport block to the radio base station, the transport block either in a frame having a frame number predetermined by the mobile communication system or in a frame having a frame number notified from the radio network controller RNC.

Here, the HARQ processing section 33c2 may generate the above-described transport block by performing a padding against blank information or MAC layer control information including a status of the mobile station (availability of the transmission power, the transmission buffer, or the like), by using such as dummy data or CRC (Cyclic Redundancy Check)

Further, the above-described transmission timing may be determined, by using a CFN (Connection Frame Number), to be a frame having a frame number "CFN mod N=0" (here, N is a value indicating a transmission Interval), for example.

Figure 4:
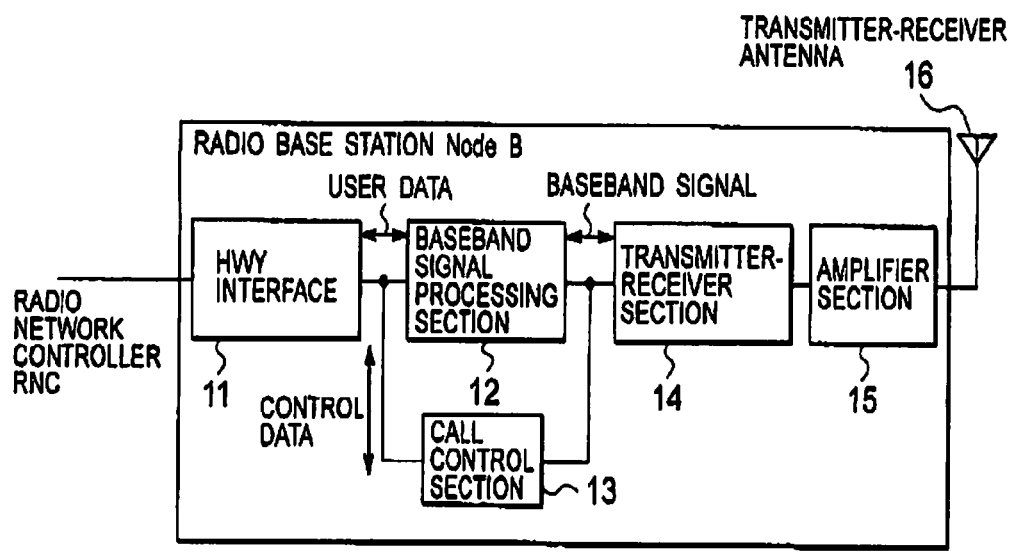
FIG. 4 is a functional block diagram of a layer-1 processing section of the baseband signal processing section in a mobile station of the mobile communication system according to the first embodiment of the present invention.

As shown in FIG. 4, the radio base station Node B according to this embodiment is provided with an HWY interface 11, a baseband signal processing section 12, a call control section 13, at least one transmitter-receiver section 14, at least one amplifier section 15, and at least one transmission—reception antenna 16.

The HWY interface 11 is an interface with a radio network controller RNC. Specifically, the HWY interface 11 is configured to receive user data transmitted from the radio network controller RNC to a mobile station UE via a downlink, so as to enter the user data to the baseband signal processing section 12. In addition, the HWY interface 11 is configured to receive control data for the radio base station Node B from the radio network controller RNC, so as to enter the received control data to the call control section 13.

In addition, the HWY interface 11 is configured to acquire, from the baseband signal processing section 12, user data included in the uplink signals which are transmitted from a mobile station UE via an uplink, so as to transmit the acquired user data to the radio network controller RNC. Further, the HWY interface 11 is configured to acquire control data for the radio network controller RNC from the call control section 13, so as to transmit the acquired control data to the radio network controller RNC.

The baseband signal processing section 12 is configured to generate baseband signals by performing such as the RLC processing, the MAC processing (MAC-d processing or MAC-e processing), and the layer-1 processing against the user date acquired from the HWY interface 11, so as to forward the generated baseband signals to the transmitter-receiver section 14.

Here, the MAC processing in the downlink Includes an HARQ processing, a scheduling processing, a transmission rate control processing, or the like. In addition, the layer-1 processing in the downlink includes a channel coding processing of user data, a spreading processing, or the like.

In addition, the baseband signal processing section 12 is configured to extract user data by performing the layer-1 processing, the MAC processing (MAC-d processing or MAC-e processing), and the RLC processing against the baseband signals acquired from the transmitter-receiver section 14, so as to forward the extracted user data to the HWY interface 11.

Here, the MAC-e processing in the uplink includes an HARQ processing, a scheduling processing, a transmission rate control processing, a header disposal processing, or the like. In addition, the layer-1 processing in the uplink includes the despreading processing, the RAKE combining processing, an error correction decode processing, or the like.

Detailed description of the functions of the baseband signal processing section 12 will be given later. In addition, the call control section 13 is configured to perform a call control processing based on the control data acquired from the HWY interface 11.

The transmitter-receiver section 14 is configured to perform a processing of converting baseband signals acquired from the baseband signal processing section 12, into radio frequency signals (downlink signals), so as to transmit the converted radio frequency signals to the amplifier section 15. In addition, the transmitter-receiver 14 is configured to perform a processing of converting the radio frequency signals (uplink signals) acquired from the amplifier section 15, into the baseband signals, so as to transmit the converted baseband signals to the baseband signal processing section 12.

The amplifier section 15 is configured to amplify the downlink signals acquired from the transmitter-receiver section 14, so as to transmit the amplified downlink signals to the mobile station UE via the transmission-reception antenna 16. In addition, the amplifier 15 is configured to amplify the uplink signals received by the transmission-reception antenna 16, so as to transmit the amplified uplink signals to the transmitter-receiver section 14.

Figure 5:
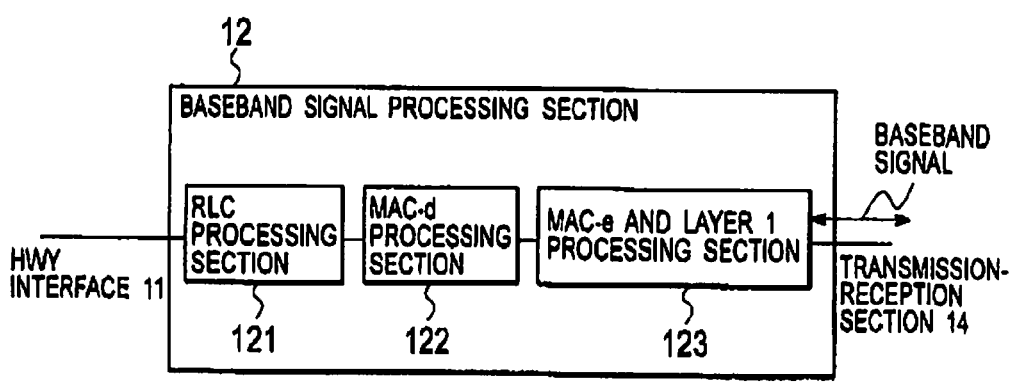
FIG. 5 is a functional block diagram of a radio base station of the mobile communication system according to the first embodiment of the present invention.

As shown in FIG. 5, the baseband signal processing section 12 is provided with an RLC processing section 121, a MAC-d processing section 122, and a MAC-e and layer 1 processing section 123.

The MAC-e and layer-1 processing section 123 is configured to perform, against the baseband signals acquired from the transmitter-receiver section 14, the despreading processing, a RAKE combining processing, an error correction decode processing, an HARQ processing, or the like.

The MAC-d processing section 122 is configured to perform a header disposal processing and the like, against an output signal from the MAC-e and layer 1 processing section 123.

The RLC processing section 121 is configured to perform such as a retransmission control processing in the RLC layer, a reconstruction processing in an RLC-SDU or the like, against the output signals from the MAC-d processing section 122.

However, these functions are not clearly divided per hardware, and can be acquired by software.

Figure 6:
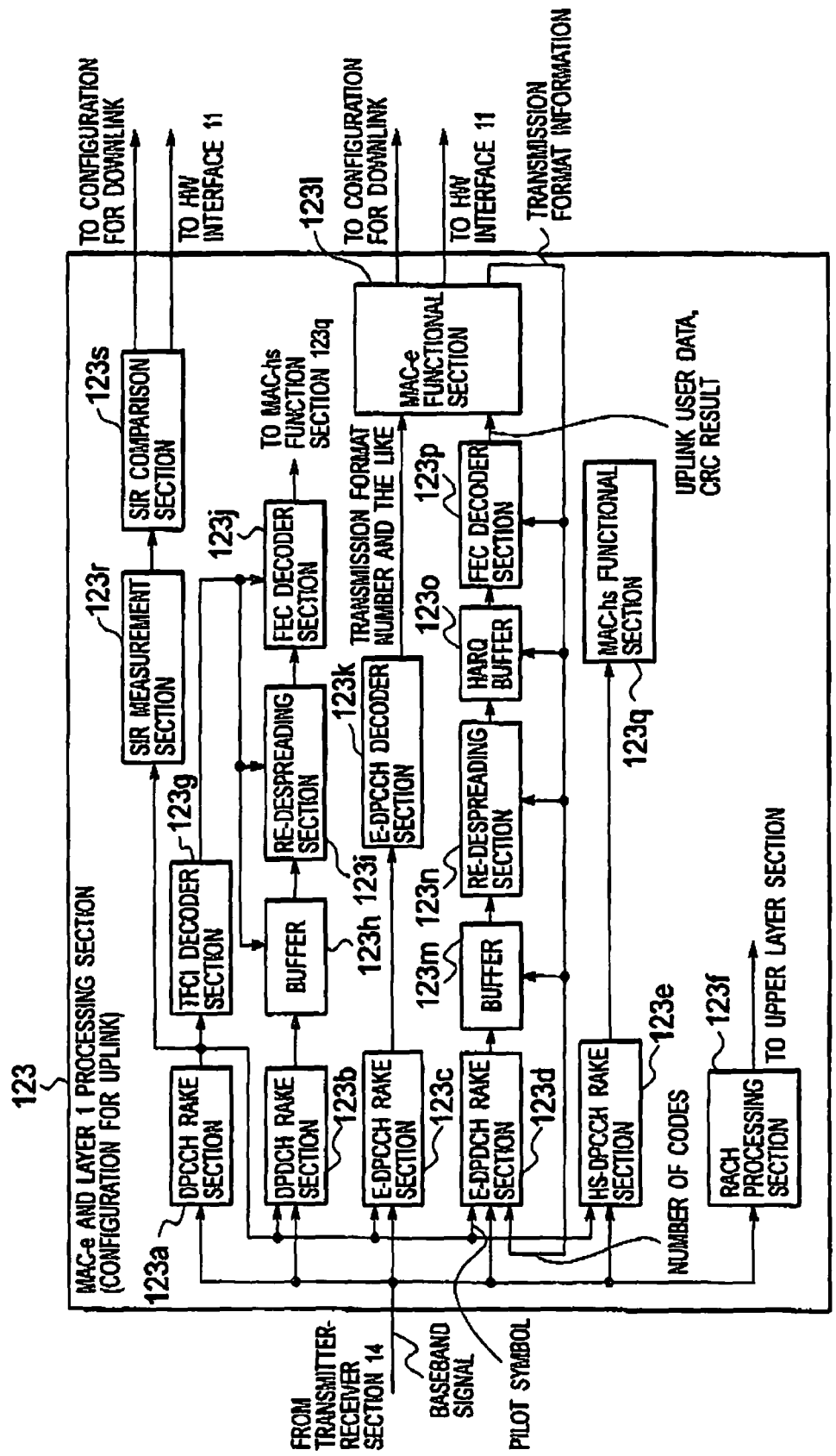
FIG. 6 is a functional block diagram of a baseband signal processing section in a radio base station of the mobile communication system according to the first embodiment of the present invention.

As shown in FIG. 6, the MAC-e and layer-1 processing section (configuration for the uplink) 123 is provided with a DPCCH RAKE section 123a, a DPDCH RAKE section 123b, an E-DPCCH RAKE section 123c, an E-DPDCH RAKE section 123d, an HS-DPCCH RAKE section 123e, an RACH processing section 123f, a Transport Format Combination Indicator (TFCI) decoder section 123g, buffers 123h and 123m, re-despreading sections 123l and 123n, FEC decoder sections 123j and 123p, an E-DPCCH decoder section 123k, a MAC-e functional section 123l, an HARQ buffer 123o, a MAC-hs functional section 123q, an SIR measurement section 123r, an SIR comparison section 123s, and an SIR comparison section 123t.

The E-DPCCH RAKE section 123c is configured to perform the despreading processing and the RAKE combining processing by using a pilot symbol included in the DPCCH, against the E-DPCCH in the baseband signals transmitted from the transmitter-receiver section 14.

The E-DPCCH decoder section 123k is configured to acquire transmission format number related information, HARQ related information, scheduling related information, or the like, by performing the decode processing against the RAKE combining outputs of the E-DPCCH RAKE section 123c, so as to enter the acquired information to the MAC-e functional section 123l.

The E-DPDCH RAKE section 123d is configured to perform a despreading processing by using the transmission format information (the number of codes) transmitted from the MAC-e functional section 123l and the RAKE combining processing using the pilot symbol included in the DPCCH, against the E-DPDCH in the baseband signals transmitted from the transmitter-receiver section 14.

The buffer 123m is configured to store the RAKE combining outputs of the E-DPDCH RAKE section 123d based on the transmission format information (the number of symbols) transmitted from the MAC-e functional section 123l.

The re-despreading section 123n is configured to perform a despreading processing against the RAKE combining outputs of the E-DPDCH RAKE section 123d stored in the buffer 123m, based on the transmission format Information (a spreading factor) transmitted from the MAC-e functional section 123l.

The HARQ buffer 123o is configured to store the despreading processing outputs of the re-despreading section 123n, based on the transmission format information transmitted from the MAC-e functional section 123l.

The FEC decoder section 123p is configured to perform an error correction decoding processing (the FEC decoding processing) against the despreading processing outputs of the re-despreading section 123n, the outputs stored in the HARQ buffer 123o, based on the transmission format information (transmission data block size) transmitted from the MAC-e functional section 123l.

The SIR measurement section 123r is configured to measure a reception SIR by using a pilot portion of the DPCCH outputted from the DPCCH RAKE section 123a.

The SIR comparison section 123s compares the measured reception SIR with the target SIR, and, in accordance with the comparison result instructs the configuration for downlink of the baseband signal processing section 12 to transmit an "Up" command or a "Down" command via the downlink.

The MAC-e functional section 123l is configured to calculate and output the transmission format information (the number of codes, the number of symbols, the spreading factor, the transmission data block size, and the like) based on the transmission format number related Information, the HARQ related information, the scheduling related information, and the like, which are acquired from the E-DPCCH decoder section 123k.

Figure 7:
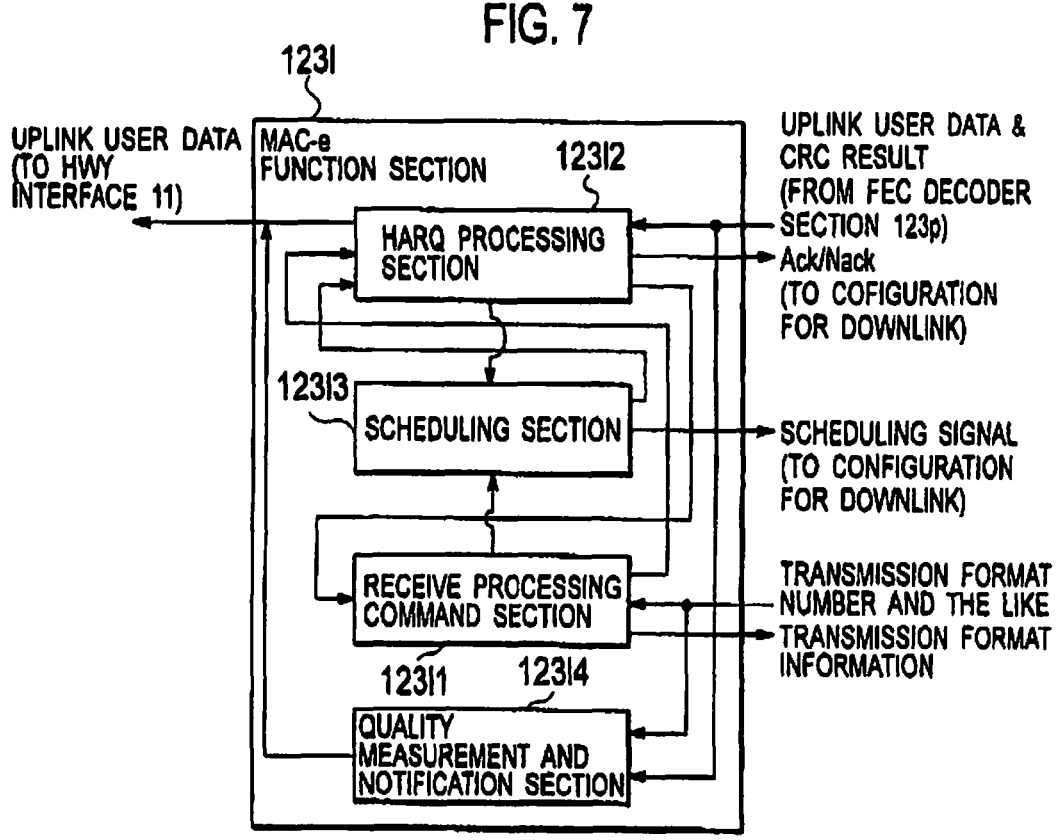
FIG. 7 is a functional block diagram of a MAC-e and layer-1 processing section (configuration for uplink), of the baseband signal processing section in a radio base station of the mobile communication system according to the first embodiment of the present invention.

In addition, as shown in FIG. 7, the MAC-e functional section 123l is provided with a receive processing command section 123l/1, an HARQ control section 123l/2, a scheduling section 123l/3, and a quality measurement and notification section 123l/4.

The receive processing command section 123l/1 is configured to transmit, to the HARQ control section 123l/2, the transmission format number related information, the HARQ related information, and the scheduling related information, which are entered from the E-DPCCH decoder section 123k.

In addition, the receive processing command section 123l/1 is configured to transmit, to the scheduling section 123l/3, the scheduling related information entered from the E-DPCCH decoder 123k.

Further, the receive processing command section 123l/1 is configured to output the transmission format information corresponding to the transmission format number entered from the E-DPCCH decoder section 123k.

The HARQ control section 123l/2 is configured to determine whether or not the reception processing of uplink user data has been successful, based on the CRC result entered from the FEC decoder section 123p. Then, the HARQ control section 123l/2 is configured to generate a transmission acknowledgement signal (Ack or Nack), based on the determination result, so as to transmit the generated transmission acknowledgement signals to the configuration for the downlink of the baseband signal processing section 12. In addition, the HARQ control section 123l/2 is configured to transmit the uplink user data entered from the FEC decoder section 123p to the radio network controller RNC, when the above determination result has been "OK".

In addition, the HARQ control section 123l/2 is configured to clear soft decision information stored in the HARQ buffer 123o when the above determination result is "OK". On the other hand, when the above determination result is "NG", the HARQ control section 123l/2 is configured to store the uplink user data in the HARQ buffer 123o.

In addition, the HARQ control section 123l/2 is configured to forward the above determination result to the receive processing command section 123l/1. Then, the receive processing control command section 123l/1 is configured to notify the E-DPDCH RAKE section 123d and the buffer 123m of a hardware resource to be prepared for the following transmission time interval (TTI), so as to perform notification for reserving the resource in the HARQ buffer 123o.

In addition, when the uplink user data is stored in the buffer 123m, the receive processing command section 123l/1 is configured to instruct the HARQ buffer 123o and the FEC decoder section 123p to perform the FEC decoding processing after combining, per TTI, a newly received uplink user data and the uplink user data in a process corresponding to the TTI, the uplink user data stored in the HARQ buffer 123o.

The scheduling section 123l/3 is configured to transmit scheduling signals (an absolute transmission rate control channel: an absolute grant control channel (AGCH), a relative transmission rate control channel: a relative grant Channel (RGCH) or the like) via a configuration for downlink.

The quality measurement and notification section 123l/4 is configured to measure a reception quality of the E-DPDCH or the E-DPCCH. Further, when a predetermined period has passed or when a reception error occurs, the quality measurement and notification section 123/4 notifies, via the HWY interface 11 to the radio network controller RNC, the reception quality (such as the number of errors, an error rate and the like) of the E-DPCCH.

Specifically, the quality measurement and notification section 123/4 receives the frame in the E-DPDCH or in the E-DPCCH, both of the E-DPDCH and the E-DPCCH transmitted from the mobile station UE. Then, the quality measurement and notification section 123/4 extracts the transport block having the predetermined minimum transport block size, the transport block in the frame having the frame number predetermined by the mobile communication system or in the frame having the frame number notified from the radio network controller. Further, the quality measurement and notification section 123/4 measures the reception quality (such as the number of errors, the error rate and the like) of the extracted transport block.

For example, the quality measurement and notification section 123/4 monitors received sequence numbers (RSNs) included in the E-DPDCH or the E-DPCCH, and recognizes that an error has occurred when any RSN is missing.

Further, the quality measurement and notification section 123/4 notifies the reception quality of the transport block, to the radio network controller RNC.

The radio network controller RNC according to the present embodiment is an apparatus located on upper level of the radio base station Node B and configured to control radio communication between the radio base station Node B and the mobile station UE.

Figure 8:
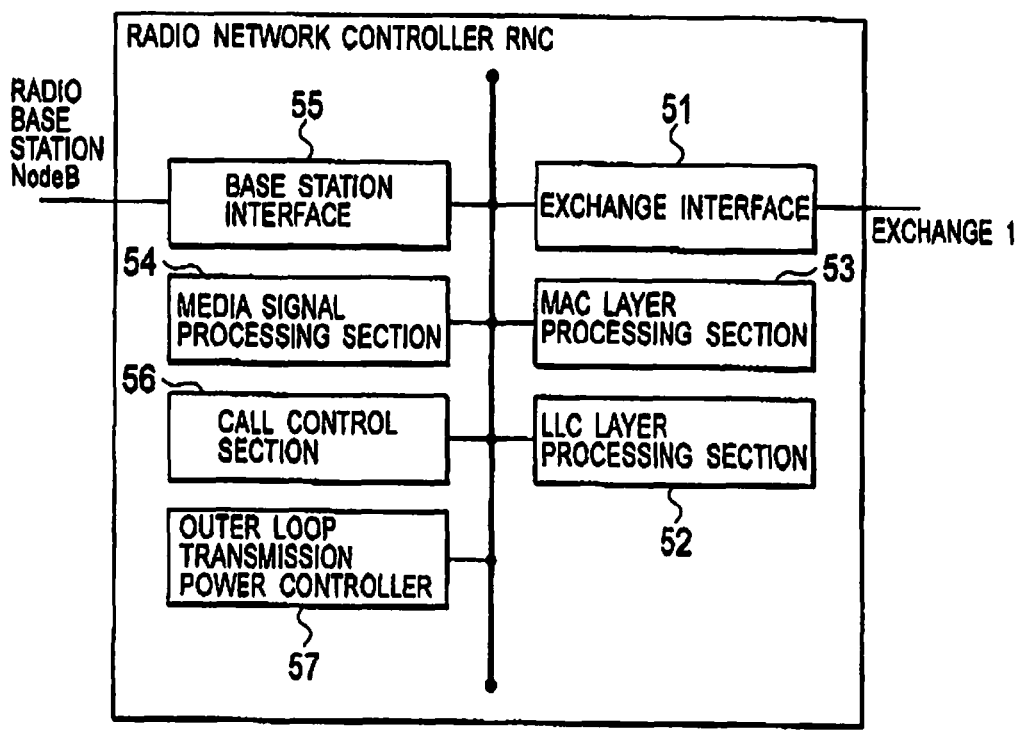
FIG. 8 is a functional block diagram of a MAC-e functional section of the MAC-e and layer-1 processing section (configuration for uplink), of the baseband signal processing section in a radio base station of the mobile communication system according to the first embodiment of the present invention.

As shown in FIG. 8, the radio network controller RNC according to this embodiment is provided with an exchange interface 51, a Logical Link Control (LLC) layer processing section 52, a MAC layer processing section 53, a media signal processing section 54, a radio base station interface 55, a call control section 56, and an outer loop transmission power controller 57.

The exchange interface 51 is an interface with an exchange 1. The exchange interface 51 is configured to forward the downlink signals transmitted from the exchange 1 to the LLC layer processing section 52, and to forward the uplink signals transmitted from the LLC layer processing section 52 to the exchange 1.

The LLC layer processing section 52 is configured to perform an LLC (Logical Link Control) sub-layer processing such as a synthesis processing of a header (e.g. a sequence number), a trailer, or the like. The LLC layer processing section 52 is also configured to transmit the uplink signals to the exchange interface 51 and to transmit the downlink signals to the MAC layer processing section 53, after the LLC sub-layer processing is performed.

The MAC layer processing section 53 is configured to perform a MAC layer processing such as a priority control processing or a header granting processing. The MAC layer processing section 53 is also configured to transmit the uplink signals to the LLC layer processing section 52 and to transmit the downlink signals to the radio base station interface 55 (or a media signal processing section 54), after the MAC layer processing is performed.

The media signal processing section 54 is configured to perform a media signal processing against voice signals or real time image signals. The media signal processing section 54 is also configured to transmit the uplink signals to the MAC layer processing section 53 and to transmit the downlink signals to the radio base station interface 55, after the media signal processing is performed.

The radio base station interface 55 is an interface with the radio base station Node B. The radio base station interface 55 is configured to forward the uplink signals transmitted from the radio base station Node B to the MAC layer processing section 53 (or the media signal processing section 54) and to forward the downlink signals transmitted from the MAC layer processing section 53 (or the media signal processing section 54) to the radio base station Node B.

The call control section 56 is configured to perform a radio resource control processing, a channel setup and open processing by the layer-3 signaling, or the like. Here, the radio resource control processing includes a call admission control processing, a handover processing, or the like.

In addition, when information to be transmitted from the mobile station UE to the radio base station Node B does not exist, the call control section 56 notifies, to both the mobile station UE and the radio base station Node B, the frame number of the frame for transmitting the transport block having the predetermined minimum transport block size.

The outer loop transmission power controller 57 measures the reception quality of the E-DPDCH. In accordance with such as the CRC result, the number of retransmissions, or the like of the E-DPDCH, so as to determine the target SIR and a gain factor. In this regard, the CRC result, the number of retransmissions, or the like of the E-DPDCH are transmitted from the radio base station Node B.

In other words, when the CRC result Is "NG" and the number of retransmissions is large, the outer loop transmission power controller 57 either Instructs the radio base station Node B to set the target SIR high, or Instructs the radio base station Node B and the mobile station UE to set the gain factor high.

Figure 9:
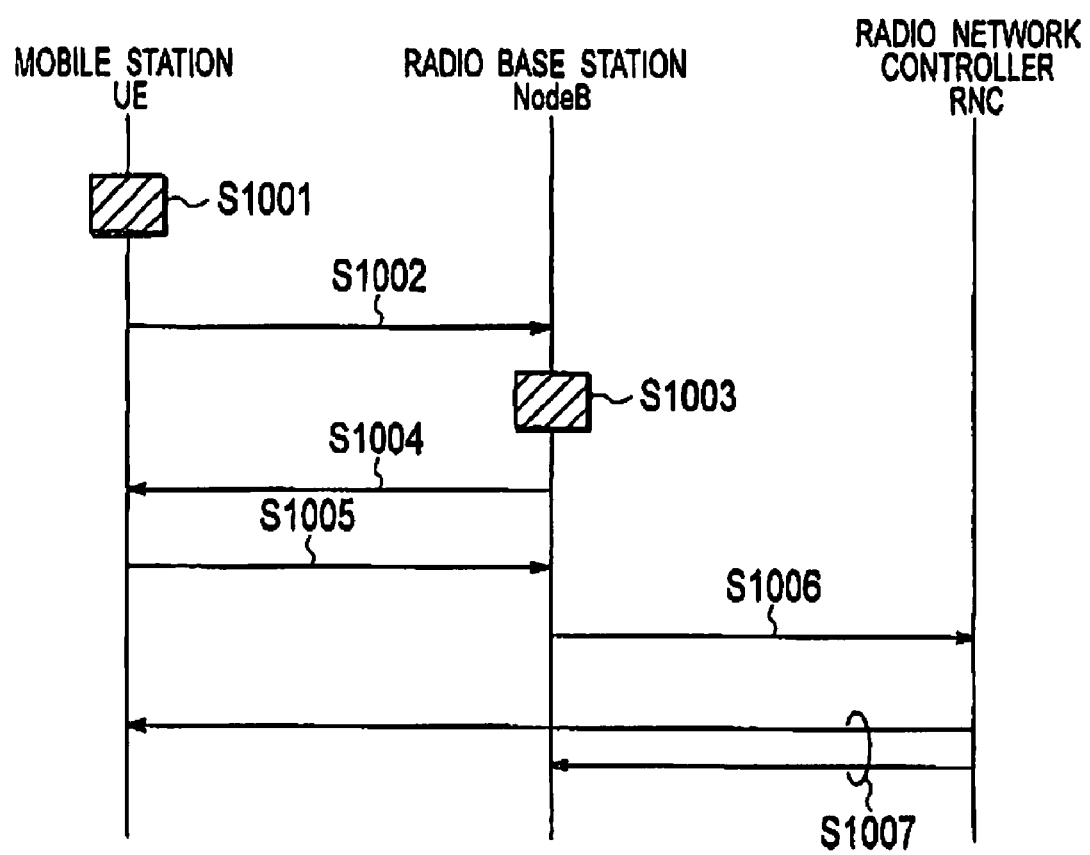
FIG. 9 is a flowchart showing an operation of the mobile communication system according to the first embodiment of the present invention.

With reference to FIG. 9, an operation of the mobile station UE of the mobile communication system according to the first embodiment of the present invention will be described.

As shown in FIG. 9, in step S 1001, when the mobile station UE detects that the data transmission has not been performed for a predetermined period, in step S1002, the mobile station UE transmits an outer loop transmission power control data (the transmission block having a minimum transport block size) in a frame having a frame number predetermined by a mobile communication system or a in frame having a frame number notified from the radio network controller RNC.

In step S1003, when the radio base station Node B cannot detect the E-DPCCH in the frame having the above-described frame number, in step S1004, the radio base station Node B transmits a "NACK" so as to prompt the mobile station UE to retransmit the outer loop transmission power control data.

When the radio base station Node B receives outer loop transmission power control data in step S1005, the radio base station Node B notifies, to the radio network controller RNC, the reception quality of the E-DPCCH and the E-DPDCH, such as the error rate and the number of retransmissions (to be more specific, the reception quality of the transport block (the outer loop transmission power control data) transmitted in the frame having the predetermined frame number, via the E-DPCCH or the E-DPDCH).

In step S1007, the radio network controller RNC determines the target SIR and the gain factor according to the reception quality of the E-DPDCH, and notifies the determined target SIR and gain factor, to the radio base station Node B and the mobile station UE.

It should be noted that the present invention is not limited to the above-described embodiment, and that various modifications are possible.

INDUSTRIAL APPLICABILITY

As described above, according to the present invention, it is possible to provide a transmission power control method, a mobile station, a radio base station, and a radio network controller that make it possible to perform an outer loop transmission power control in a more stable manner by preventing a status of being unable to detect the E-DPCCH.

What is claimed is:

1. A transmission power control method which controls a transmission power of data transmitted from a mobile station to a radio base station via an uplink, comprising:
   generating, at the mobile station, a transport block having a predetermined minimum transport block size, when information to be transmitted to the radio base station does not exist;
   transmitting, from the mobile station to the radio base station, the transport block in a frame having a frame number predetermined by a mobile communication system or in a frame having a frame number notified from a radio network controller;
   extracting, at the radio base station, the transport block included in the frame having the frame number; and
   performing, at the radio base station and at the radio network controller, an outer loop transmission power control on the transmission power, according to a reception quality of the transport block.

2. The transmission power control method according to claim 1, wherein the transport block is generated by performing a padding on MAC layer information which includes a status of the mobile station.

3. The transmission power control method according to claim 1, wherein the transport block is generated by performing a padding on blank information.

4. A mobile station, comprising:
   a transport block generating section configured to generate a transport block having a predetermined minimum transport block size, when information to be transmitted to a radio base station does not exist; and
   a transport block generating section configured to transmit, outer loop transmission power control data to the radio base station, comprising the transport block in a frame having a frame number predetermined by a mobile communication system or in a frame having a frame number notified from a radio network controller.

5. A radio base station for achieving a transmission power control method which controls a transmission power of data transmitted from a mobile station to the radio base station via an uplink, comprising:
   an extraction section configured to receive a frame transmitted from the mobile station, and to extract a transport block having a predetermined minimum transport block size, the transport block included in a frame having a frame number predetermined by a mobile communication system or in a frame having a frame number notified from a radio network controller; and
   a notification section configured to notify, to the radio network controller, a reception quality of the extracted transport block.

6. A radio network controller for achieving a transmission power control method which controls a transmission power of data transmitted from a mobile station to a radio base station via an uplink, comprising:
   a notification section configured to notify, to the mobile station and the radio base station, a frame number of a frame for transmitting a transport block having a predetermined minimum transport block size, when information to be transmitted from the mobile station to the radio base station does not exist; and
   an outer loop transmission power control section configured to perform an outer loop transmission power control on the transmission power, according to a reception quality of the transport block having the predetermined minimum transport block size, the reception quality notified from the radio base station.

* * * * *